United States Patent
Nakatsuyama

(10) Patent No.: US 6,253,246 B1
(45) Date of Patent: Jun. 26, 2001

(54) DATA SERVICE SYSTEM, DATA DISTRIBUTION UNIT, DATA TERMINAL, AND DATA DISTRIBUTION METHOD

(75) Inventor: Takashi Nakatsuyama, Chiba (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/174,335

(22) Filed: Oct. 19, 1998

(30) Foreign Application Priority Data

Oct. 21, 1997 (JP) .................................................. 09-288811

(51) Int. Cl.⁷ ....................................................... G06F 15/16
(52) U.S. Cl. ............................................. 709/233; 709/247
(58) Field of Search .................................. 709/235, 227, 709/232, 233, 247, 204, 246; 370/232; 386/85, 101; 345/428; 435/173.4

(56) References Cited

U.S. PATENT DOCUMENTS

| | | | |
|---|---|---|---|
| 5,032,927 | * 7/1991 | Watanabe et al. | 386/101 |
| 5,434,860 | * 7/1995 | Riddle | 370/232 |
| 5,612,788 | * 3/1997 | Stone | 386/85 |
| 5,764,235 | * 6/1998 | Hunt et al. | 345/428 |
| 5,864,678 | * 1/1999 | Riddle | 709/235 |
| 5,983,263 | * 11/1999 | Rothrock et al. | 709/204 |
| 5,996,022 | * 11/1999 | Krueger et al. | 709/247 |
| 6,002,720 | * 12/1999 | Yurt et al. | 375/240 |
| 6,032,189 | * 2/2000 | Jinzenji et al. | 709/235 |
| 6,128,668 | * 10/2000 | Barber et al. | 709/246 |

* cited by examiner

*Primary Examiner*—Ayaz Sheikh
*Assistant Examiner*—Patrice Winder
(74) *Attorney, Agent, or Firm*—Jay H. Maioli

(57) ABSTRACT

A data distribution system adapted to transmit a compressed data from a data distribution unit located at a server's side to a data receiving unit located at a user's side. A high efficiency of data transmission is attained without the unnecessary occupancy of a data communications network by varying the transmission volume to a suitable volume for the transmission of a desired compressed data requested by the user.

21 Claims, 4 Drawing Sheets

| GENRE \ QUALITY | C1 STEREO | C2 STEREO | C3 MONOPHONIC | C4 MONOPHONIC |
|---|---|---|---|---|
| CLASSIC | ○ | ○ | — | — |
| JAZZ | ○ | ○ | — | — |
| ROCK AND ROLL | — | ○ | — | — |
| POPULAR | — | ○ | ○ | — |
| ⋮ | | | | |
| MUSIC GUIDE | — | — | ○ | — |
| NEWS/WEATHER FORECAST | — | — | ○ | ○ |

COMPRESSION RATIO
$C1<C2<C3<C4$
C1 ATRAC 1 256kbps(0~16K)
C2 ATRAC 2 128kbps(0~16K)
C3 ATRAC 2mono 64kbps(0~16K)
C4 ATRAC 2Vmono 32kbps(0~8K)
(C5 ATRAC 4 16kbps(0~8K))

FIG.3

DATA SERVICE SYSTEM, DATA DISTRIBUTION UNIT, DATA TERMINAL, AND DATA DISTRIBUTION METHOD

BACKGROUND OF THE INVENTION

1. Field of the Invention

The present invention relates to a data service system, data distribution unit, data terminal and data distribution method, suitably usable for a data service system for distributing digital data, for example.

2. Description of Related Art

Recently, the video and audio data compression technology and the digital signal processing technology in the fields of broadcasting and communications have shown remarkable innovations. In these situations, it has been proposed to organize between a user and server a data communications system incorporating such advanced data compression and signal processing technology. Generally, the data communications system is called "video on demand (VOD)" or "music on demand (MOD)" system and is designed to serve a digital data to a user accessing to the system.

In conventional data communication systems, however, the server adopts a data transfer mode to the server's own convenience with no consideration to the user's convenience. Thus, when a large volume of data is served to the user from the system, the reception of the large volume of data will take much time at the user's side even if the served data may not be of a high quality.

In the MOD system, a data requested by the user is sent from the server and down-loaded into a hard disk at the user's side. In this case, the user demanding for a data service will select a desired one of the received data according to a music guidance such as a music data list or a guide to artists or musicians and music titles and contents, and download it. Once the user requests the server for distribution of the desired music data, however, since a high-grade, high-quality data is sent from the server to the user though the user does not want so high a quality for the data, much time will be taken until the user finally gets the data and the user will be charged a lot for the service. This is a problem of the conventional MOD system.

Also with the VOD system, the user cannot select a quality for a video data the user wants to have from the server. For instance, there is a case that the user employs a small-screen monitor to reproduce the served video data because the data may not be of a high quality. In this case, however, since the server does not give any consideration to the user's convenience, the high quality of the served data cannot be covered by the user's small-screen monitor. This is a problem of the conventional VOD system.

As briefly mentioned above, the conventional data communication system does not reflect the user's request for the data transfer mode. The data served to the user from the server is of a higher a quality than the user hopes, and the long time required for the data downloading will cause the data communications network to be congested when many users access the system. Thus, some of the data served from the system imposes a big fee and a long download time on the user. For these reasons, the users avoids downloading the served data into his player.

SUMMARY OF THE INVENTION

Accordingly, the present invention seeks to overcome the above-mentioned drawbacks of the prior art by providing a data communications system and data communications method, and a data receiver and data receiving method applied to the data communications system and method, adapted to select a quality of a data which is to be served from a server to a user on demand.

The present invention also seeks to overcome the above drawbacks of the prior art by providing a data communications system reflecting a data transfer mode and time that the user wants.

The above object can be achieved by providing a data distribution system comprising:

a data distribution unit for distributing a compressed data; and a terminal unit which includes:
  means for selectively requesting, by the user, the data distribution unit to serve a desired compressed data;
  means for transmitting a send request signal for the desired compressed data selected by the selective requesting means; and
  means for receiving the desired compressed data transmitted from the data distributor;

the data distribution system further comprising:
  means for varying the volume of the compressed data transmitted from the data distribution unit according to the send request signal transmitted from the terminal unit.

The above object can also be achieved by providing a data distribution unit, comprising:

means for storing a plurality of data;

means for selectively retrieving a desired data from the data storing means according to a request from a terminal unit located in a remote place;

means for transmitting the desired data selected by the data retrieving means; and means for controlling the volume of data transmitted from the transmitting means according to the type of the desired data to be transmitted.

Also the above object can be achieved by providing a terminal unit adapted to receive a compressed data transmitted at a predetermined compression rate from an information service center according to a request for the compressed data sent from the terminal unit, comprising:

means for selecting a desired compressed data and requesting the information service center to distribute the desired compressed data;

means for transmitting a send request signal for the desired data selected by the selecting means;

means for receiving the desired compressed data transmitted from a data distribution unit; and means for expanding the compressed data received by the receiving means into a form corresponding to a compression mode employed for the data compression at the information service center.

The above object can also be achieved by providing a data distribution method for transmission of a compressed data between an information service center and a terminal unit, comprising the steps of:

selecting a desired compressed data and requesting the information service center to distribute the desired compressed data;

transmitting to the information service center a send request signal for the selected compressed data;

varying the volume of the compressed data transmitted from the information service center according to the send request signal transmitted from the terminal unit;

transmitting to the terminal unit the desired compressed data whose volume has been varied at the information service center; and receiving, by the terminal unit, the desired compressed data transmitted from the information service center and whose volume has been varied there.

BRIEF DESCRIPTION OF THE DRAWINGS

These objects and other objects, features and advantages of the present intention will become more apparent from the following detailed description of the present invention when taken in conjunction with the accompanying drawings, of which:

FIG. 3 is a table showing a correspondence between data genre and quality, implemented according to the present invention.

DETAILED DESCRIPTION OF THE PREFERRED EMBODIMENTS

Figure 1:
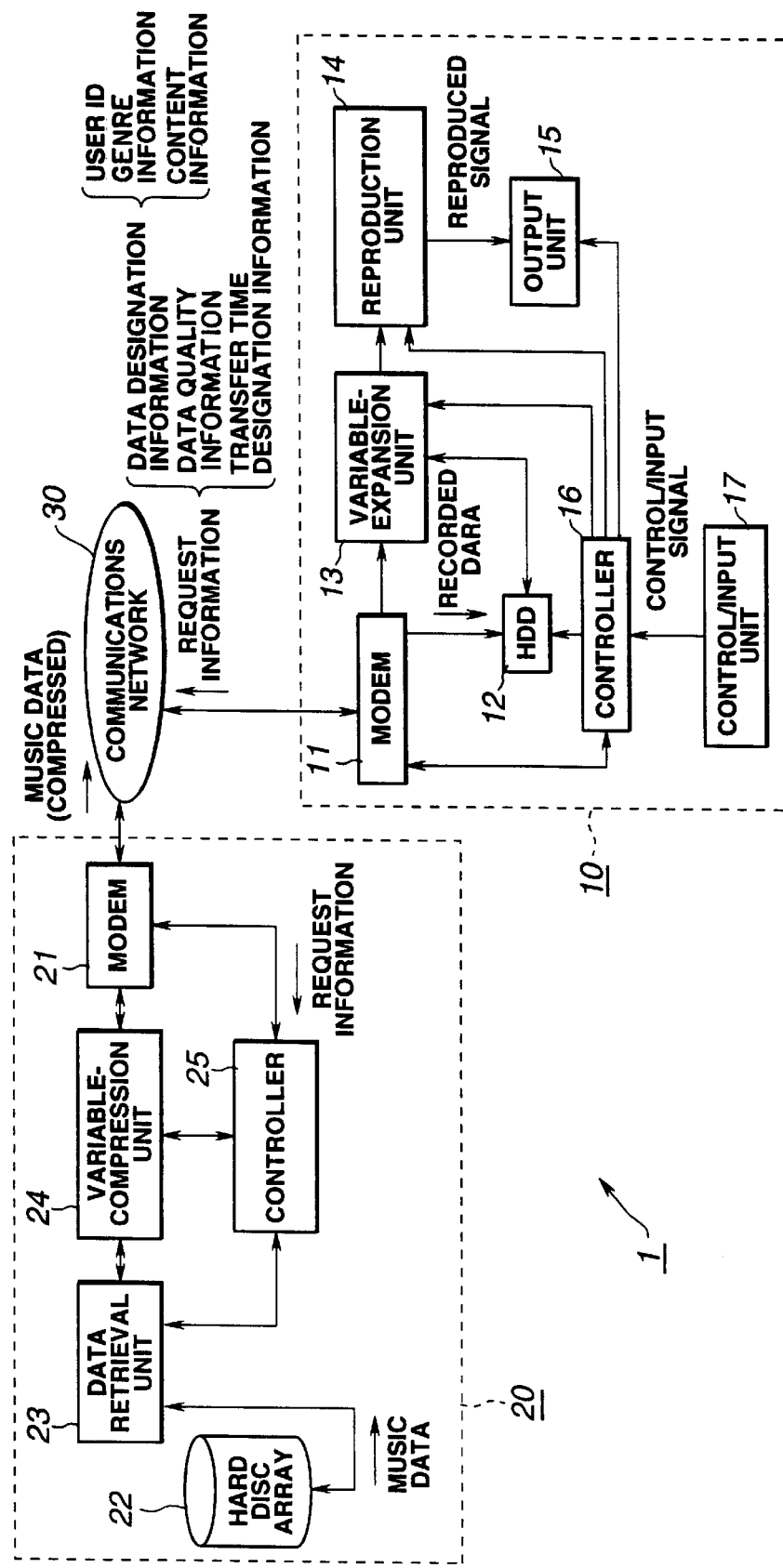
FIG. 1 is a block diagram of a data communications system according to the present invention.

Referring now to FIG. 1, a data communications system 1 according to the present invention will be explained below. This system is a so-called MOD (music on demand) system. It comprises a data receiver 10 being a user's terminal unit, and a data transmitter 20 being a server's terminal unit. The data receiver 10 and data transmitter 20 are connected by a communications network 30 such as telephone line. Note that the data receiver 10 is installed as a household appliance in the user's home. The data transmitter 20 is provided in a data service center being the server. Only one data receiver 10 is shown in FIG. 1 but it should be noted that actually a plurality of data receivers 10 is connected via the communications network 30 to the data transmitter 20 at the server's side The data receiver 10 sends a request information on the user's demand to the data transmitter 20. The data transmitter 20 will transmit a data to the data receiver 10 based on the received request information. The data receiver 10 will record and/or reproduce the data transmitted from the data transmitter 20.

As shown in FIG. 1, the data receiver 10 comprises a MODEM 11 connected via the communications network 30 to the data transmitter 20 for data communications between the data receiver 10 and data transmitter 20, a hard disc drive (HDD) 12 to store the data received by the MODEM 11, a variable-expansion unit 13 (variable expander) to expand or decompress the data received by the MODEM 11, a reproduction unit 14 to process the data output from the variable-expansion unit 13 for reproduction in a predetermined manner, an output unit 15 including a speaker, monitor, headphone jack, etc. (not illustrated), a controller 16 to control the whole data receiver 10, and a control/input unit 17 with a keyboard, mouse, etc. (not illustrated) to give a command or instruction to the controller 16.

The MODEM 11 is connected to the data transmitter 20 via the communications network 30 and transmits to the data transmitter 20 a request information supplied from the controller 16 and which will be further described later. Further, the MODEM 11 receives a data transmitted from the data transmitter 20 based on the request information, and supplies it to the HDD 12 and variable expander 13. It should be noted that the MODEM 11 is adapted to perform each of its functions under the control of a corresponding control signal supplied from the controller 16.

The HDD 12 has a hard disc (not shown) to store data transmitted from the data transmitter 20. The data supplied from the MODEM 11 is recorded into the hard disc. The HDD 12 records into a data area thereof music data and other transmitted data or data served in the form of a compressed data from the data transmitter 20 which will be further described later, and the HDD 12 records into a control area thereof (will be referred to as "TOC (=Table of Contents)" hereinafter a management information comprising the name, recording date and time, and compressed mode of the data recorded into the data area. Furthermore, for reproduction of any one of the stored data, the HDD 12 reads out the data and supplies it to the variable expander 13. It should be noted that the HDD 12 is adapted to perform each of its functions under the control of a corresponding control signal supplied from the controller 16.

The variable expander 13 is adapted to expand, under the control of a control signal from the controller 16, a compressed data or similar data transformed from the data transmitter 20 through the MODEM 11 in an expansion mode corresponding to the compression mode in which the received data has been compressed at the data transmitter 20, and supply the expanded or decompressed data to the reproduction unit 14. Also the variable expander 13 expands, under the control of a control signal from the controller 16, a recorded data from the HDD 12 in an expansion mode corresponding to the compression mode in which the data has been compressed, and supplies it to the reproduction unit 14.

Note that the data transmitter 20 has a variable-compression unit or variable compressor 24 to which the variable expander 13 corresponds. In this embodiment of the present invention, the variable compressor 24 in the data transmitter 20 adopts the Adaptive Transform Acoustic Coding (ATRAC) mode. Therefore, the variable expander 13 in the data receiver 10 adopts a compression mode corresponding to the ATRAC mode. It should be noted, however, that the variable compressor 24 and variable expander 13 may adopt any data compression mode and data expansion mode, respectively, prescribed in the Transform Domain Weighted Interleave Vector Quantization (TwinVQ), RealAudio, Moving Picture Coding Experts Group (MPEG) and similar systems.

Under the control of a control signal from the controller 16, the reproduction unit 14 converts from digital to analog and amplifies the expanded data supplied from the variable expander 13 to reproduce an analog audio signal, and supplies it to the speaker and headphone jack of the output unit 15. Thus, an audio output signal is delivered from the speaker of the output unit 15 in the data receiver 10.

The output unit 15 is provided with a monitor having a display screen 15a which will be further discussed later. Receiving a control signal from the controller 16 and an RF signal, the monitor displays an image on the screen.

The controller 16 comprises a personal computer, for example. The controller 16 has installed therein a control program for acquiring a music data or the like from the data transmitter 20 via the communications network 30. Executing this control program, the controller 16 controls the MODEM 11, HDD 12, variable expander 13, reproduction unit 14 and the monitor of the output unit 15. The controller 16 is connected to the control/input unit 17. Under the control of a control/input signal entered into the controller 16 by operating the keyboard and mouse of the control/input unit 17, the controller 16 runs each control function included in the control program.

More particularly, the controller 16 controls the MODEM 11 to transmit, to the data transmitter 20, a data designation or definition information including a user ID for identification of a user, a genre information regarding the genre of a user-desired music data or the like and a content information regarding the data name (will be referred to as "content name" hereinafter) further including the name of the player and title of the music data to the data transmitter 20, and also a data quality information to designate or define a quality for a data which is to be transmitted from the data transmitter 20. Further, the controller 16 controls the MODEM 11 to transmit, to the data transmitter 20, an information to designate a transfer time for the data to be transmitted from the data transmitter 20. That is to say, the request information includes a data designation information, data quality information and a transfer time designation information, as shown in FIG. 1. A user ID included in the data designation information should be preliminarily recorded during initial setting of the control program.

Note that after start-up of the control program, the so-called Graphical User Interface (GUI) mode, for example, should be adopted to enter the above information into the controller 16 through interaction with the monitor of the output unit 15 by using the keyboard or mouse of the control/input unit 17. In particular, there will appear on the display screen 15a of the monitor a content name input field 2 for entry of a content name, a quality setting field 3 for setting of the quality of a requested data to be served from the data transmitter 20, a transfer time setting field 4 for setting of the transfer time of the requested data to be served from the data transmitter 20, and a genre select field 5 for selection of the genre of the requested data to be served from the data transmitter 20, from the top toward the bottom of the screen, as shown in FIG. 2.

When a user first designates any one of the genres indicated in the genre select field 5 on the display screen 15a by using the mouse or keyboard, a list of content names for the selected genre will be displayed and a cursor will move to the content name input field 2, waiting for an input. Further, when the user writes the name of a desired data into the content name input field 2 by using the keyboard or the like and pushes the return key, a user ID preregistered for the user in the controller 16 will be added to the data name written in the content name input field 2 and thus a data designation information will be generated by the controller 16, and the quality setting field 3 and transfer time setting field 4 will stand waiting for setting.

Figure 2:
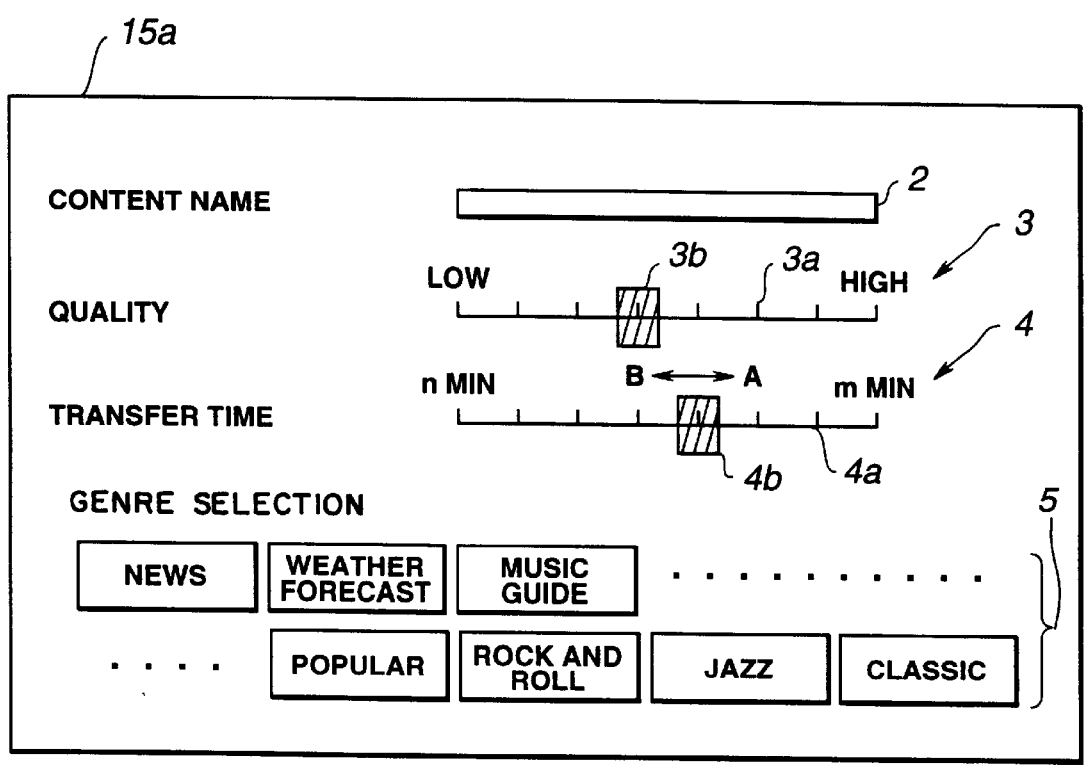
FIG. 2 shows a display on a screen of a display unit according to the present invention.

As shown in FIG. 2, the quality setting field 3 and transfer time setting field 4 have scales 3a and 4a, respectively, on which there are provided indexes 3b and 4b, respectively, which can be moved in the directions of arrows A and B by operating the mouse or the like. In the quality setting field 3, when the index 3b is moved in the direction of arrow A, a higher data quality is set. On the other hand, when the index 3b is moved in the direction of arrow B, a lower data quality is set. In the transfer time setting field 4, when the index 4b is moved in the direction of arrow A, a longer transfer time is set. When the index 4b is moved in the direction of arrow B, a shorter transfer time is set. When a data quality and transfer time are set by the user operating the mouse or the like, the controller 16 will generate a corresponding data quality designation information and transfer time designation information.

It will be appreciated that for the setting of a desired quality and transfer time in the quality and transfer time setting fields 3 and 4, respectively, a recommendable quality and a corresponding recommendable transfer time should be indicated on the display screen 15a when any of the genres indicated in a genre select field 5 on the display screen 15a is designated by using the mouse or the like.

After the above operation, the controller 16 will control the MODEM 11 to transmit to the data transmitter 20 a data designation information, quality designation information and a transfer time designation information together as a request information at a time, as shown in FIG. 1.

Further, the controller 16 will control the MODEM 11 and variable expander 13 to expand or decompress a music data or the like served in the form of a compressed data from the data transmitter 20 which has received the request information from the data receiver 10, for the data before compressed. Further, the controller 16 will control the reproduction unit 14 to reproduce into an analog signal the data decompressed by the variable expander 13. Thus, the data receiver 10 can real-time deliver a received music data or the like from the speaker of the output unit 15.

Note that to store a music data or the like, the controller 16 will control the MODEM 11 and HDD 12 to record into the hard disc the music data served in the form of a compressed data from the data transmitter 20. To reproduce the recorded data, the controller 16, will control the HDD 12 to read the data from the hard disc and supply it to the variable expander 13 while controlling the reproduction unit 14 to process the data decompressed by the variable expander 13 into an analog reproduced signal. Further the controller 16 will control the reproduction unit 14 to reproduce the data generated by the variable expander 13 and not yet processed into an analog signal. Thus, the data receiver 10 can deliver the reproduced one of the recorded data in the hard disc from the speaker of the output unit 15.

On the other hand, the data transmitter 20 at the server's side is adapted to receive the request information transmitted from the data receiver 10 at the user's side via the communications network 30, retrieve a data corresponding to the data designation in the received request information, compress the retrieved data in a predetermined compression mode, and transmit the compressed data to the data receiver 10 via the communications network 30.

As seen from FIG. 1, the data transmitter 20 is connected to the data receiver 10 via the communications network 30. It comprises a MODEM 21 for data communications, a large-capacity hard disc array 22 having a plurality of music data or the like recorded therein, a data retrieval unit 23 to retrieve a data corresponding to the data designation in the request information from the hard disc array 22, a variable-compression unit or variable compressor 24 to compress the data retrieved by the data retrieval unit 23 in a predetermined compression mode, and a controller 25 to control the whole data transmitter 20.

The MODEM 21 in the data transmitter 20 is connected to the data receiver 10 via the communications network 30. It receives the request information transmitted from the data receiver 10 and supplies it to the controller 25. Also the MODEM 21 transmits to the data receiver 10 a compressed data supplied from the variable compressor 24 which will be further described later. Its should be noted that the MODEM 21 performs each of the functions thereof under the control of a corresponding control signal from the controller 25.

The hard disc array 22 is adapted to store music data for meeting a music on demand (MOD), music guide data for selection of a desired music, and other audio data including news, weather forecast, etc.

The data retrieval unit 23 is adapted to receive through the controller 25 a request information transmitted from the data receiver 10 and received by the MODEM 21, and to retrieve from the many data including music data stored in the hard disc array 22 a data corresponding to the data designation information included in the request information. Then, it reads the corresponding data from the hard disc array 22 for delivery to the variable compressor 24. It should be noted that the data retrieval unit 23 performs each of the functions thereof under the control of a corresponding control signal from the controller 2.

The variable compressor 24 is adapted to compress the data from the data retrieval unit 23 in a predetermined compression mode under the control of the data designation information included in the request information received from the data receiver 10 and a control signal from the controller 25. It should be noted that this embodiment adopted the ATRAC mode of data compression as will be apparent from the later description but any other modes such as the aforementioned TwinVQ, RealAudio and MPEG modes will suffice.

The controller 25 has installed therein a transmission control program to transmit to the data receiver 10 a music data or the like, corresponding to the data designation included in the request information received from the data receiver 10 via the communications network 30, in the form of a data compressed in a predetermined compression mode. Under the control of this program, the controller 25 controls the MODEM 21, data retrieval unit 23 and variable compressor 24.

More particularly, the controller 25 receives a request information transmitted from the data receiver 10 via the communications network 30 and controls the MODEM 21 to provide the controller 25 with the received request information. The controller 25 stores the request information supplied from the MODEM 21 once, and supplies it to the data retrieval unit 23. It will be appreciated that the controller 25 may be adapted to extract only the data designation information from the request information for delivery to the data retrieval unit 23.

Also the controller 25 controls the data retrieval unit 23 to retrieve a data based on the data designation information included in the request information, and read the retrieved data from the hard disc array 22 for delivery to the variable compressor 24.

Furthermore, the controller 25 controls the variable compressor 24 to compress the data supplied from the data retrieval unit 23 according to the data designation information and transfer time designation information included in the request information and supply the compressed data to the MODEM 21. Referring to the user ID in the data designation information, the controller 25 controls the MODEM 21 to transmit the compressed data supplied from the variable compressor 24 to the data receiver 10.

Referring now to FIG. 3, one example of the data compression by the variable compressor 24 and controller 25 in the data transmitter 20 will be described below. In this embodiment, the variable compressor 24 adopts any of the compression modes ATRAC1, ATRAC2, ATRAC2 mono and ATRAC2V mono in order to compress a data. Note that it is determined by the controller 25 generating a predetermined control signal referring to a data designation information and transfer time designation information included in a request information which of these compression modes is to be adopted for compression of a data to be served to the data receiver 10. Thus, the data transmitter 20 can serve the data receiver 10 a music data or the like read out from the hard disc array 22 and compressed in one of the choice of compression rates or ratios selected according to the user's request and genre of the data. More particularly, the controller 25 has preliminarily set therein a table of a correspondence between the data genre and quality as shown in FIG. 3 (will be referred to as "data quality table" hereinafter), and controls the variable compressor 24 based on the data quality table for compression of the data to be served to the data receiver 10.

As shown in FIG. 3, the data quality table includes 4 kinds of compression modes $C_1$ to $C_4$ for a data to be transferred to the data receiver 10. Of the compression modes, $C_1$ is ATRAC1 for the lowest compression rate, $C_2$ is ATRAC2, $C_3$ is ATRAC2 mono, and $C_4$ is ATRAC2V mono (the compression modes will be referred to simply as "$C_1$" "$C_2$" "$C_3$" and "$C_4$" respectively, hereinafter for the simplicity of the explanation). The compression rate ascends in the order of $C_1$, $C_2$, $C_3$ and $C_4$. $C_1$ and $C_2$ are destined for data transfer in stereophonic mode, while $C_3$ and $C_4$ are for data transfer in monophonic mode.

Thus, for transfer of a predetermined volume of data for a predetermined time, any one of the compression modes $C_1$ to $C_4$ should be selected as necessary taking the following in account. For example, $C_1$ is for a transfer rate of 256 kbps in a bandwidth of 16 kHz, $C_2$ is for a transfer rate of 128 kbps in a bandwidth of 16 kHz, $C_3$ is for a transfer rate of 64 kbps in a bandwidth of 16 kHz, and $C_4$ for a transfer rate of 32 kbps in a bandwidth of 8 kHz.

As mentioned above, $C_1$ provides a data compression at a highest rate and with a highest quality. Since the total transmission volume of data compressed in this mode is relatively large, however, the transfer of such a data will take a longer time. On the other hand, $C_4$ provides a data compression at a lowest rate and with a lowest quality. However, since the total transmission volume of data compressed in this mode is relatively small, however, the transfer of such a data takes a shorter time.

With a consideration given to the general tendency of users' demand, this embodiment is adapted to select a somewhat limited number of data compression modes for some genres of music data or the like. In particular, the dynamic range of classic and jazz music data is wide, and most of the users demand a high quality for the transfer of such music data. A transfer of such data with a low quality is rarely demanded. Therefore, this embodiment is adapted to select only the compression modes $C_1$ or $C_2$ for transfer of classic and jazz music data.

However, the dynamic range of rock and roll music data is narrow, so that most of the users requesting for service of such music data demand not so high a quality for the transfer of the data. Since serving of jazz music data in monophonic mode and with low quality is less demanded, the compression mode for such jazz music is limited to $C_2$ in this embodiment.

Generally, service of popular music is demanded rather more than classic, and so this embodiment is adapted to select the compression mode $C_2$ as well as the monophonic $C_3$ with a possible congestion of the communications network 30 taken in consideration.

Furthermore, a music guide data for guidance of the list of the above-mentioned music data, new music artists and new musical compositions, for example, is frequently demanded from the users. Since such guide data may not be transferred in any stereophonic mode, the compression mode is limited only to monophonic $C_3$.

Data such as news or weather forecast should be transferred for a time as short as possible to provide the users with up-to-date data as early as possible. Therefore, the compression mode for transfer of such data is limited to monophonic $C_3$ or $C_4$.

In this embodiment, only the compression mode $C_2$ is selectable for transfer of rock and roll music data. However, it will be appreciated that the embodiment may be adapted to select also the compression mode $C_1$ for transfer of the rock and roll music as in the transfer of classic or jazz music data. Also, the compression mode for transfer of the music guide is limited only to $C_3$. However, it should be noted that the compression mode $C_4$ may be selected in addition to $C_3$ for transfer of the music guide data as in transfer of news or weather forecast data. Furthermore, to further reduce the data transfer time, a compression mode $C_5$ (ATRAC4) for example may be added to the data quality table. In this case, to transfer the aforementioned predetermined volume of data for a predetermined time, a bandwidth of 8 kHz and a rate of 16 kbps may be used.

Since in this embodiment, the number of available compression modes is limited somehow using the data quality table depending upon the genre of music data or the like, data compressed in an optimum compression mode for each user's demand can be transferred, the communications network 30 can be prevented from being congested, and the data transfer can be effected with reduced costs. That is, the present invention can eliminate any unnecessary or wasteful things which are found in the conventional data distribution systems, and enable an efficient data service from the server and to the user.

Note that the data communications system 1 may have the data quality table provided at the data receiver 10. In this case, the aforementioned data quality information is generated based on the data quality table. Also, since the data receiver 10 can know the compression mode of a data transmitted from the data transmitter 20 based on a request information sent from the data receiver 10 as having been described above, it can control the variable expander 13 based on the data quality table provided in itself. Furthermore, the data communications system 1 may of course be adapted to have the data quality table provided in both the data receiver 10 and data transmitter 20.

Figure 4:
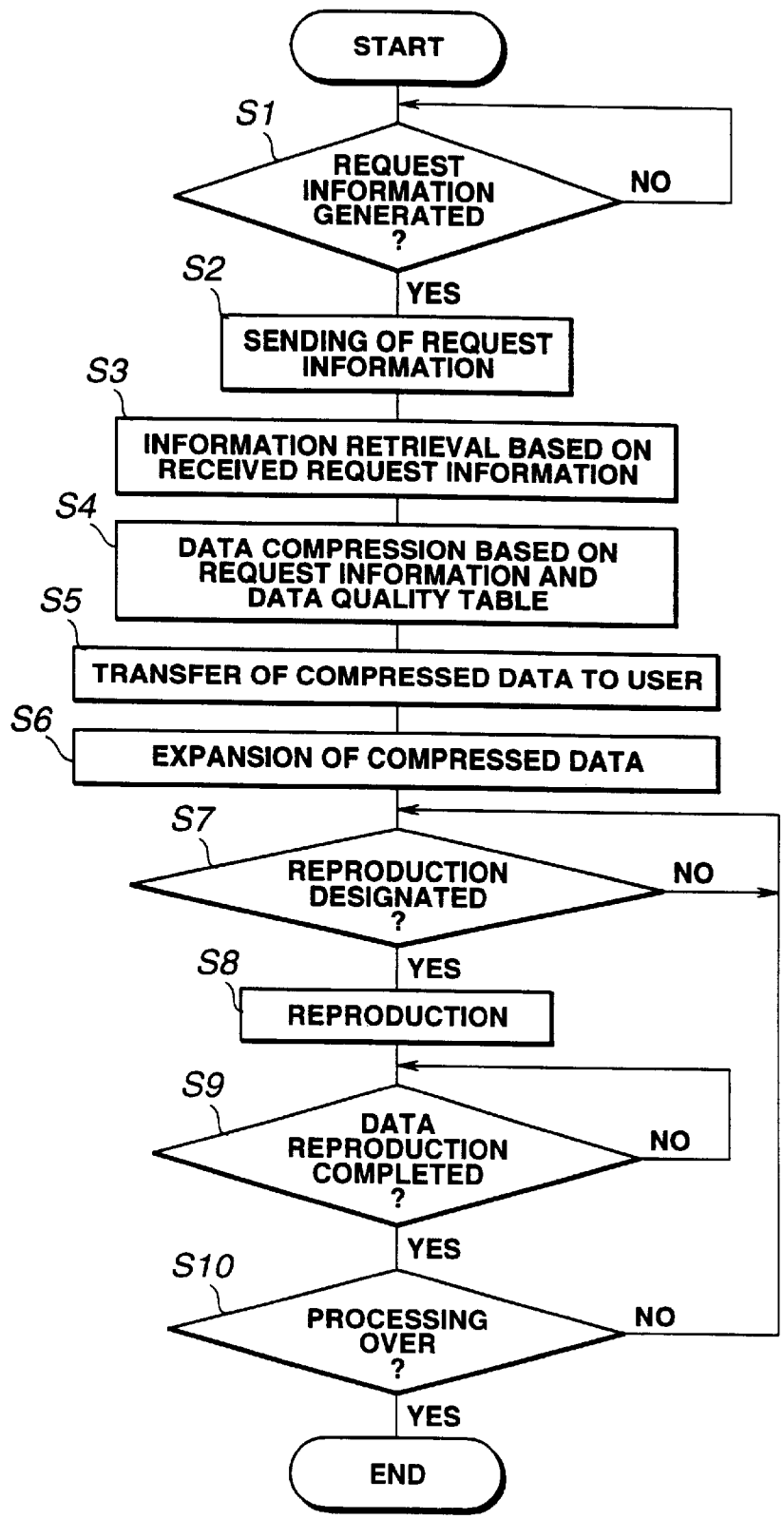
FIG. 4 is a flow chart of the operating procedures of the data distribution system according to the present invention.

The flow of operations for a data communication between the data receiver 10 and data transmitter 20 of the data communications system 1 of the present invention will be discussed hereinafter with reference to the flow chart shown in FIG. 4.

After the control program is put into run, the data receiver 10 stands at step S1, and the controller 16 of the data receiver 10 at the user's side makes an operation control to provide an indication as shown in FIG. 2 on the display screen 15a of the monitor, and thus the data receiver 10 shifts to a mode in which a data genre, content name, transfer quality, transfer time, etc. is entered to generate a request information including a data designation information and data quality information as having previously been described. With the above operation, the user determines the genre, content name, transfer quality and transfer time for a data which the user requests the data transmitter 20 for service. Thus, the data receiver 10 generates, by the controller 16, a data designation information, data quality information and a transfer time designation information which are collected into a request information. The request information is stored once in a memory (not illustrated) of the controller 16. Upon completion of this information storage, the controller 16 will go to step S2.

If only a genre and content name of a data the user requests for service from the data transmitter 20 are entered at step SI, a data quality information and transfer time designation information will be generated based on the aforementioned recommended quality for the genre covering the data in consideration, and a transfer time corresponding to the recommended quality. In this case, it suffices to provide the data quality table at the data receiver 10.

Also at step S1, the user may selectively enter a transfer quality and transfer time of a data requested for service from the data transmitter 20. At step S1, the user may enter a transfer time for a desired data in minutes or in seconds. The operation for this input will be further described later.

At step S2, the controller 16 reads the generated request information from the memory and controls the MODEM 11 to send it to the data transmitter 20 via the communications network 30.

The data transmitter 20 receives the request information sent from the data receiver 10, and then the controller 25 will control the data retrieval unit 23 to retrieve in the hard disc array 22 a requested data based on the content information in the data designation information (at step S3). The retrieved data is read from the hard disc array 22.

At step S4, the controller 25 in the data transmitter 20 will control the variable compressor 24 to compress the data supplied from the data retrieval unit 23 in such a manner as to convert the data to a user-defined quality based on the request information, in particular, on the data quality information or transfer time designation information and data quality table as shown in FIG. 3. More particularly, if the genre of the user-requested data is a classic music and the user-defined quality data quality is high (or the user-defined transfer time is long), the controller 25 will control the variable compressor 24 to compress the data in the ATRAC1 mode ($C_1$) referring to the data quality table shown in FIG. 3.

It should be note that at step S4, the data transmitter 20 may generate a genre information based on the retrieval at step S3. In this case, no reference may be made to the genre information sent from the data receiver 10.

At step S5, the controller 25 of the data transmitter 20 will control the MODEM 21 to transfer the compressed data to the data receiver 10 via the communications network 30 with reference to the user ID.

Thus, the controller 16 of the data receiver 10 will control the MODEM 11 to receive the compressed data transferred from the data transmitter 20, and the variable expander 13 to decompress the received compressed data. The compressed data is thus expanded or decompressed at step S6. It should be noted that if the user has defined a genre for the received data, the variable expander 13 will decompress the compressed data in an appropriate mode since the recommended compression mode is already known from the data quality table.

Also if the user has set a data quality and transfer time by the control/input unit 17, the received data will be expanded or decompressed in a mode corresponding to the data quality and transfer time set by the user.

It should also be noted that for storage of the compressed data, the controller 16 will control the MODEM 11 and HDD 12 to record the received compressed data into the hard disc.

After the variable expander 13 starts decompressing the compressed data from the data transmitter 20, the controller will shift to step S7. At this step, the controller 16 will wait for an instruction to reproduce the data being expanded or decompressed. Namely, the controller 16 of the data receiver 10 will stay at step S7 until a signal for instruction of the data reproduction comes from the control/input unit 17, and then the controller 16 will go to step S8.

At step S8 after the data reproduction instruction signal is entered, the controller 16 will control the reproduction unit 14 to start reproducing the data. Then, in the data receiver 10, the data thus acquired is supplied as an analog signal to the output unit 15 and the output 15 will deliver a classic music, for example, from the speaker thereof.

At next step S9, the controller 16 will detect the data reception status of the MODEM 11 to judge whether the data has been reproduced successfully. The controller 16 will stay at step S9 until it is decided that the data reproduction is completed. Then the controller 16 will go to step S10.

At step S10, the controller 16 shifts to a selection mode in which it is judged whether the data reproduction is to be terminated or not. For instance, when the keyboard is operated to select the termination of data reproduction, the above-mentioned series of operations is terminated. On the contrary, when it is selected that the reproduction should not be terminated, for example, when a recorded data in the HDD 12 should be reproduced, the controller 16 will go back to step S7 and repeat the operations in steps S7 to S9.

It should be noted that in the data communications system 1, the mouse or the like may operated at the data receiver 10 to move the index 4b in the transfer time setting field 4 shown in FIG. 2, thereby permitting the user to define a detailed data transfer time so that "a classic music is served for 3 min".

In this case, the controller 25 in the data transmitter 20 calculates a means transfer rate for the data by dividing a total volume of the data before compressed, supplied from the data retrieval unit 23 at step S4, by the user-defined transfer time. Then the controller 25 will control the MODEM 21 to detect a rate at which data can be transferred between the data transmitter 20 and data receiver 10 (will be referred to as "actual transfer rate"hereinafter) and feed back a difference between the detected actual transfer rate and the above-mentioned calculated mean transfer rate to the variable compressor 24, thereby to determine a compression rate or ratio. Note that in this case, the controller 25 may not refer to the data quality table shown in FIG. 3. Further, the controller 25 shall control the variable compressor 24 to compress the data at the rate thus determined, and then go to step S5.

Thus, data transfer can be completed within a user-defined time in the data communications system 1, so a data service that, for example, a fee for any data download within 3 min is fixed, will be convenient to the user.

Note that the data communications system 1 may be adapted such that if the compression rate determined as in the above exceeds a predetermined threshold, for example, if a high compression rate that cannot be attained by the variable compressor 24 is required, the data transmitter 20 will send a message data "No download possible within your defined transfer time" to the data receiver 10 which in turn will display the message data on the monitor of the output unit 15.

As having been described in the foregoing, it is possible in the data communications system 1 to select a data quality, more particularly, a data transfer mode, transfer time, etc. according to a user's request. Namely, according to the present invention, the quality of a data to be transferred can reflect sufficiently a user's request and a reasonably low fee can be set for a data service which would not be used by many users because of its unreasonable service fee. Also according to the present invention, the total time for data download can be considerably reduced for a more efficient utilization of the communications network 30, so that a data transmission media can be kept as a whole from being congested. Moreover, according to the present invention, if a fee system is set such that a service fee shall be calculated for a served amount of data at a rate of a unit money per megabyte of served data, for example, the user can clearly know the relationship between the quality of the served data and the fee amount for the service, which will also meet the user's convenience.

Further, according to the present invention, the wasteful or unnecessary things in the system can be eliminated and thus an efficient service can be provided from the server and to the user.

In the foregoing, the present invention has been described concerning one example of the MOD system. However, the present invention is not limited to this MOD system but of course is applicable to the VOD system, a digital data distribution system for multimedia information including still image data, text data, program data, etc.

In the aforementioned embodiment of the present invention, the variable compressor 24 is adapted to compress data in four kinds of modes. However, the present invention is not limited to this number of compression modes but it suffices that at least two or more different kinds of compression modes can be used by the variable compressor 24. Similarly, the variable expander 13 in the data receiver 10 may be a one that can use two or more different kinds of expansion modes corresponding to the compression modes adopted in the variable compressor 24 in the data transmitter 20.

Moreover, in the embodiment having been described in the foregoing, data not compressed is stored in the hard disc array 22 and it is compressed by the variable compressor 24. However, the present invention is not limited to this embodiment, but may be adapted to store compressed data in the hard disc array 22 beforehand. In this case, for one music data or the like, at least two or more kinds of data different in compression rate from each other have to be stored in the hard disc array 22 but the variable compressor 24 is not required so that the entire data transmitter 20 can be more simplified in configuration. Also, the compression at step S4 shown in FIG. 4 is unnecessary so that the control by the controller 25 can be more simplified.

The embodiment of the present invention has been described concerning data communications made over a telephone line between a MODEM at the server's side and a MODEM at the user's side, but the present invention can also provide data communications over an integrated services digital network (ISDN) or satellite communications network.

Also, the embodiment has been described concerning the hard disc as a storage media to stored down-loaded compressed data, but a rewritable optical disc or large-capacity IC memory may be used as the storage media in place of the hard disc.

Moreover, the embodiment has been described in the foregoing regarding the distribution of compressed music data, but a computer game data can also be distributed according to the present invention.

What is claimed is:

1. A data distribution system, comprising:
a data distribution unit for transmitting compressed data; and
a terminal unit including
means for selectively requesting, by a user, the data distribution unit to transmit a desired compressed data in one of a desired quality and a desired transfer time;
means for transmitting a send request signal for the desired compressed data selected by the means for selectively requesting;
means for receiving the desired compressed data transmitted from the data distribution unit;
means for storing the desired compressed data into storage means; and
means for reproducing the desired compressed data from said storage means in the one of the desired quality and the desired transfer time selected by the user;
the data distribution system further comprising
means for varying a volume of the compressed data transmitted from the data distribution unit according to the send request signal transmitted from the terminal unit.

2. The data distribution system as set forth in claim 1, wherein the volume of the compressed data transmitted is varied by varying a data compression rate provided by the means for varying a volume.

3. The data distribution system as set forth in claim 1, wherein the volume of the compressed data transmitted is varied by varying a number of transmission channels provided by the means for varying a volume.

4. The data distribution system as set forth in claim 1, wherein the send request signal transmitted from the terminal unit is a genre corresponding to the desired compressed data.

5. The data distribution system as set forth in claim 1, wherein the send request signal transmitted from the terminal unit is a name of a content corresponding to the desired compressed data.

6. The data distribution system as set forth in claim 1, wherein the terminal unit further comprises:
controlling means for variably controlling the volume of the compressed data transmitted from the data distribution unit.

7. The data distribution system as set forth in claim 6, wherein the send request signal transmitted from the terminal unit is an information on the volume of transmitted data varied by the controlling means.

8. The data distribution system as set forth in claim 6, wherein the variable control of the volume of transmitted data by the controlling means is attained by controlling a data compression rate.

9. The data distribution system as set forth in claim 6, wherein the variable control of the volume of transmitted data by the controlling means is attained by controlling a data transfer time.

10. A data distribution unit, comprising:
data storing means for storing a plurality of data;
data retrieving means for selectively retrieving a desired data in one of a desired quality and a desired transfer time from the data storing means according to a request, by a user, from a terminal unit located in a remote place;
transmitting means for transmitting the desired data selected by the data retrieving means; and
controlling means for automatically controlling a volume of data transmitted from the transmitting means according to a type of the desired data to be transmitted.

11. The data distribution unit as set forth in claim 10, further comprising:
means for compressing the desired data selected by the data retrieving means at a predetermined compression rate; and
the controlling means being adapted to vary a data compression rate according to the type of the data to be transmitted.

12. The data distribution unit as set forth in claim 10, wherein the controlling means is adapted to control a number of transmission channels according to the type of the data to be transmitted.

13. The data distribution unit as set forth in claim 10, wherein the data storing means is adapted to store, of the plurality of stored data, at least two data compressed at different rates for a same content and the controlling means is adapted to select and control one of the data compressed at the different rates and stored in the data storing means according to the type of the data to be transmitted.

14. The data distribution unit as forth in claim 10, further comprising:
means for storing a table with reference to which the volume of the transmitted data is determined corresponding to the type of the data to be transmitted.

15. A terminal unit adapted to receive compressed data transmitted at a predetermined compression rate from an information service center according to a request for the compressed data sent from the terminal unit, comprising:
selecting means for selecting, by a user, a desired compressed data in one of a desired quality and a desired transfer time and requesting the information service center to distribute the desired compressed data;
means for transmitting a send request signal for the desired data selected by the selecting means;
receiving means for receiving the desired compressed data transmitted from a data distribution unit;
storage means for storing the desired compressed data;
means for expanding the compressed data received by the receiving means into a form corresponding to a compression mode employed for data compression at the information service center; and
means for reproducing the expanded data from said storage means in the one of the desired quality and the desired transfer time selected by the selecting means.

16. A terminal unit adapted to receive compressed data transmitted at a predetermined compression rate from an information service center according to a request for the compressed data sent from the terminal unit, comprising:
selecting means for selecting a desired compressed data in a desired quality and in a desired transfer time and requesting the information service center to distribute the desired compressed data;
means for transmitting a send request signal for the desired data selected by the selecting means;
receiving means for receiving the desired compressed data transmitted from a data distribution unit;
storage means for storing the desired compressed data;
means for expanding the compressed data received by the receiving means into a form corresponding to a compression mode employed for data compression at the information service center; and
means for reproducing the expanded data from said storage means in the desired quality selected by the selecting means.

17. The terminal unit as set forth in claim 16, further comprising:
setting means for setting the compression rate for the compressed data to be transmitted from the information service center; and
means for transmitting to the information service center a send request for a data compressed at the compression rate set by the setting means.

18. The terminal unit as set forth in claim 16, further comprising:
means for setting a transfer time for the compressed data to be transmitted from the information service center; and
means for transmitting to the information service center a send request for a data which is transmittable for the transfer time set by the setting means.

19. The terminal unit as set forth in claim 16, further comprising:
means for setting a genre for the compressed data to be transmitted from the information service center; and
means for transmitting to the information service center a send request for a data included in the genre set by the means for setting a genre.

20. A data distribution method for transmission of a compressed data between an information service center and a terminal unit, comprising the steps of:
selecting, by a user, a desired compressed data in one of a desired quality and a desired transfer time and requesting the information service center to distribute the desired compressed data;
transmitting to the information service center a send request signal for the selected compressed data;
varying a volume of the compressed data transmitted from the information service center according to the send request signal transmitted from the terminal unit;
transmitting to the terminal unit the desired compressed data having a volume that has been varied at the information service center;
receiving, by the terminal unit, the desired compressed data transmitted from the information service center having a volume that has been varied at said information service center;
storing the desired compressed data into storage means; and
reproducing the desired compressed data from said storage means in the one of the desired quality and the desired transfer time selected in the selecting step.

21. A data distribution method for transmission of a compressed data between an information service center and a terminal unit, comprising the steps of:
selecting a desired compressed data in a desired quality and in a desired transfer time and requesting the information service center to distribute the desired compressed data;
transmitting to the information service center a send request signal for the selected compressed data;
varying a volume of the compressed data transmitted from the information service center according to the send request signal transmitted from the terminal unit;
transmitting to the terminal unit the desired compressed data having a volume that has been varied at the information service center;
receiving, by the terminal unit, the desired compressed data transmitted from the information service center having a volume that has been varied at said information service centers;
storing the desired compressed data into storage means; and
reproducing the desired compressed data from said storage means in the desired quality selected in the selecting step.

* * * * *